Figure 1:
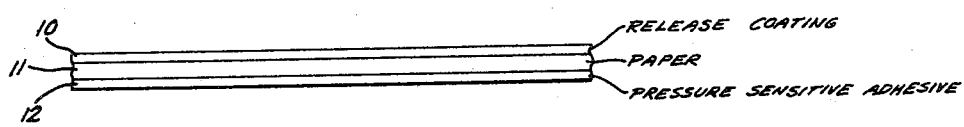

Nov. 19, 1963     S. GOLD ETAL     3,111,449
RELEASE COATINGS FOR PRESSURE SENSITIVE ADHESIVES
Filed April 28, 1961

THE RELEASE COATING IS FORMED OF
VINYLIDENE CHLORIDE - ETHYL ACRYLATE -
FUMARIC ACID TERPOLYMER.

INVENTORS
SAMUEL GOLD
LEONARD FOX
BY
ATTORNEYS

3,111,449
RELEASE COATINGS FOR PRESSURE SENSITIVE ADHESIVES
Samuel Gold, Berkeley Heights, and Leonard Fox, Union, N.J., assignors to National Starch and Chemical Corporation, New York, N.Y., a corporation of Delaware
Filed Apr. 28, 1961, Ser. No. 106,162
2 Claims. (Cl. 161—151)

This invention relates to improved release coatings for use with pressure sensitive adhesive tapes and labels.

It is the object of this invention to provide novel coating resins which are useful in the preparation of release coatings for pressure sensitive adhesive tapes and labels. More particularly, it is our object to provide low cost release coatings for pressure sensitive tapes and labels, said coatings being characterized by their low release values and their minimal effect upon the performance of the pressure sensitive adhesives with which they are in contact. A further object of our invention is to provide release coatings which display freedom from plasticizer migration, and are resistant to the conditions encountered during steam sterilization procedures.

As is known in the art, pressure sensitive adhesive tapes comprise paper, cloth or synthetic plastic film backed tapes coated on one or both surfaces with an adhesive which is aggressively and permanently tacky at room temperature and which adheres to a variety of dissimilar surfaces with nothing more than hand pressure. These pressure sensitive tapes are highly versatile and are used in any number of applications requiring sealing, reinforcing or banding. Pressure sensitive adhesives are also often employed with paper backed labels and these pressure sensitive labels are especially useful in the packaging field.

In order to be able to conveniently store and handle these pressure sensitive tapes and labels there are two procedures which are ordinarily followed. In the case of tapes, one procedure involves coating the non-adhesive surface of the tape backing with a material which displays very little affinity for the pressure sensitive adhesive. Thus, the tape may be wound on a spool or roll and when the free end is lifted or pulled it will be readily separated from the coated surface of the underlying backing without any danger of tearing or other damage. Another procedure which may be utilized involves the use of a so called release sheet or release strip which is simply a sheet or strip, usually made from paper, and which has one or both of its surfaces coated with a material which again displays a low degree of affinity, i.e. a lack of adhesion, for the pressure sensitive adhesive. In the case of tapes, such a release sheet or strip is placed in contact with the adhesive surface of the tape. This release coated tape is then wound on a spool or roll. In using the tape, the release sheet is merely stripped away from the adhesive coated surface of the tape. Pressure sensitive labels are usually provided with release sheets although, if desired, they may also be coated on their non-adhesive surfaces with a low adhesion coating which obviates the need for a separate release sheet.

The coating materials which are used to provide a low degree of adhesion to pressure sensitive adhesives are commonly referred to as release coatings. These coatings may be derived from a wide variety of sources, including both natural and synthetic resins. The type of release coating which is used will, of course, depend upon the particular adhesive as well as on the nature of the material which is used for either the tape backing and/or the release sheet.

With many types of pressure sensitive tapes and labels, either the backing or the release sheet are made from paper and the pressure sensitive adhesive is very often a rubber based formulation. For this particular combination there are a number of materials which have heretofore been employed as release coatings. One such class of materials are films derived from latices of vinyl chloride and vinyl chloride copolymer resins. Release coatings prepared from these resins latices have good initial release qualities but on aging trouble often develops when the plasticizer, which many of these latices contain, migrates, to the surface whereupon it comes into contact with the adhesive and causes it to have a high degree of adhesion for the release sheet or backing.

Another material, often used as a release coating for rubber based adhesives having paper backings or paper release sheets, are the coatings derived from nitrocellulose laquers. However, these nitrocellulose films also suffer from a number of critical limitations. Thus, as was noted with vinyl chloride resin films, the problem of plasticizer migration is again at hand. Moreover, these films tend to discolor on aging while the necessity of having to prepare these films from lacquer systems raises their cost since the practitioner must take the usual precautions required for the handling of these expensive and dangerous organic solvents.

Still another type of release coating are the laminations of paper with cellulose triacetate films. When used as release sheets, these laminates are positioned so that the cellulose triacetate surface is in contact with the pressure sensitive adhesive. In addition to being rather expensive, the release properties of these cellulose triacetate laminates are somewhat limited in comparison with coatings prepared from vinyl chloride and nitrocellulose resin films.

Also of interest as release coatings for pressure sensitive labels are the films derived from various silicone resins. Although these silicone coatings have very good release properties, their major drawback, to date, has been their rather high cost which has, of course, limited their use.

We have now discovered that by employing certain vinylidene chloride terpolymer resins, it is possible to prepare release coatings for rubber based pressure sensitive adhesive tapes and labels which are free from all of the disadvantages inherent in release coatings derived from the materials heretofore utilized for this purpose.

The novel release coatings of our invention are prepared from an aqueous emulsion or latex of a homogeneous vinylidene chloride:ethyl acrylate:fumaric acid terpolymer which may contain from 85 to 93%, by weight, of vinylidene chloride; from 7 to 15%, by weight, of ethyl acrylate; and, from 0.25 to 3.0%, by weight, of fumaric acid. These terpolymer emulsions may be readily prepared by means of any of the aqueous emulsion polymerization techniques well known to those skilled in the art. In brief, these techniques involve the reaction of an aqueous emulsion of the respective monomers in the presence of a free radical type polymerization catalyst with various buffers, activators and emulsifying agents also being present within the reaction mixture. Additional details relating to the preparation of these terpolymers may be obtained in the copending patent application entitled "Improved Vinylidene Chloride Resin Compositions," Serial No. 86,313, filed February 1, 1961, and assigned to the assignee of the subject application.

As noted earlier, the release coatings of our invention are for use with rubber based pressure sensitive adhesive tapes and labels which should, moreover, be employed in combination with paper backings and/or paper release sheets or strips. The rubber based pressure sensitive adhesives are usually deposited upon their paper backings in the form of organic solvent solutions; although, in some cases, aqueous emulsions or latices or these adhesives are also employed. In addition to the rubber, these adhesive formulations may contain various other ingredients such as zinc oxide, antioxidants, and small quantities of tackifying resins and other adhesion promoters.

Figure 2:
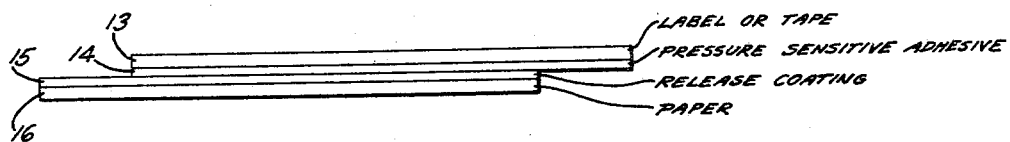

In the accompanying drawing, FIGURE 1 represents a film (label or tape) comprising paper 11 coated on one side with a pressure sensitive adhesive 12 and on the other side with the release coating of this invention 10. FIGURE 2 represents a pressure sensitive film (label or tape) protected by a removable release sheet, or liner. In this case 13 and 14 together represent the label or tape, 13 being the backing and 14 being a pressure sensitive adhesive coated on a surface thereof. The release sheet consists of paper 16 coated with the terpolymer of this invention 15, the terpolymer coating being in contact with the pressure sensitive coating 14 of the label or tape.

The paper backings and release sheets which are employed with pressure sensitive tapes may be derived from any type of paper which may vary from kraft to sulfite to rope paper depending upon the end use properties which are required. In most cases, however, these paper backings and release sheet papers are saturated with a resin, usually a butadiene:acrylonitrile or butadine:styrene copolymer resin latex so as to provide a resin solids pickup in the range of from 80–120% of the weight of the paper. By saturating the tape backings and release sheets in this manner, the rubber adhesive and/or the release coating resin is retained on the surface of the backing or release sheet and is thus prevented from penetrating into the backing or the release sheet. It should also be noted that we have found that our vinylidene chloride terpolymer emulsion resins do themselves provide excellent paper saturants for release sheet paper stock which is subsequently given a coating of the same terpolymer resin.

In the case of pressure sensitive labels, the paper backing may again be derived from any variety of paper whose use may be desired by the practitioner. Ordinarily, these backings are not saturated as they are usually prepared from glassine or kraft paper.

The actual use of our vinylidene chloride terpolymer resin in the preparation of release coatings may be accomplished by the use of any technique which is capable of depositing a continuous resin film upon the surface of the respective tape backing, label backing or release sheet paper stock. Thus, preferred procedures for the deposition of these aqueous terpolymer emulsions are the air knife, reverse roll and trailing blade coating techniques. Curtain coaters are also effective and, while gravure, offset gravure and roll coaters are less efficient, they may also be used where desired by the practitioner. In many cases, optimum results may be obtained by the application of two light-weight coatings rather than by the use of only one heavier coating. It should be noted that these vinylidene chloride terpolymer emulsions provide coatings which are non-blocking on exposure to the drying and finishing operations normally encountered with the equipment used to manufacture and coat paper. These compositions also display excellent stability under the varying conditions of mechanical handling which are employed in connection with the high speed coating apparatus prevalent in the paper industry.

The coating weight required to form continuous films from these vinylidene chloride resin emulsions will vary from about 4–14 pounds of resin solids per 3000 square feet of the substrate being coated, with optimum coatings being obtained with coating weights of from 8–12 pounds of resin per 3000 square feet of substrate. Within this preferred coating weight range, the thickness of the dry films will vary from about 0.3 to 0.4 mil.

The drying of our release coatings may be handled by air drying the coated substrate or by the use of forced air oven drying, infra-red or radiant heat drying. Here again, such drying methods are well known and the practitioner may employ the drying means best suited to his particular needs in light of the equipment which is available.

In any case, the release coatings prepared with these vinylidene chloride terpolymer emulsions are superior to the release coatings derived from prior art materials. Thus, the release coatings of our invention are found to have exceptionally low release values which readily allow for the rapid and tear free removal of rubber based pressure sensitive adhesive tapes and labels. Furthermore, our coatings have no adverse effects upon the performance of these adhesives even after prolonged periods of contact. This is in direct contrast to the behavior of release coatings derived from vinyl chloride and nitrocellulose resins wherein plasticizer migration often results in deleterious effects upon the adhesive properties of the tape or label.

Still another surprising and advantageous property of our release coatings is their resistance to the high temperatures and humidities which are encountered during steam sterilization procedures. This property allows these coatings to be used in sterile products which are intended for surgical or first-aid applications.

The following examples will more clearly illustrate the embodiment of our invention. In these examples all parts given are by weight unless noted.

*Example 1*

This example compares the release properties of coatings derived from our vinylidene chloride terpolymer resins against the release properties of coatings derived from a presently employed release coat resin. It also illustrates the use of various resins, including our vinylidene chloride terpolymer, as saturants for the release sheet paper.

Four sheets of crepe paper were each, respectively, saturated with the following saturants:

*Saturant #1.*—A polyethyl acrylate resin latex.

*Saurate #2.*—A 90:10:1 vinylidene chloride:ethyl acrylate:fumaric acid terpolymer emulsion.

*Saturant #3.*—A 40:60 ethyl acrylate:vinyl acetate copolymer emulsion.

*Saturant #4.*—A 60:40 butadiene:acrylonitrile copolymer latex.

The above described saturants were applied so that the crepe paper sheets picked up 90% of their weight in resin solids from each of the respective saturants. After these saturated sheets were thoroughly dried, they were cut in half and each half sheet was then given a coating derived from a 90:10:1 vinylidene chloride:ethyl acrylate:fumaric acid terpolymer emulsion having a resin solids content of 45%, by weight. The four remaining half sheets were then similarly coated with a 95:5 vinyl chloride:vinyl acetate copolymer latex having a resin solids content of 52% by weight, this latex being widely employed for the preparation of release coatings. After air drying, the final thickness of all eight of these coatings was 0.4 mil. The above described procedure was again repeated wherein, in this case, the final vinylidene chloride terpolymer coatings were dried for 10 minutes at a temperature of 266° F.

In determining the release value of these coatings, the procedure followed, in each case, involved applying a one inch wide strip of a natural white rubber based pressure sensitive adhesive tape to each coated sample. Using an Instron tensile tester, the peel adhesion, i.e. the force required to separate the tape from the coated release sheet, was then immediately determined at a peel rate of 12 inches per minute. These tests were also repeated on identical samples, i.e. release coat plus tape, which had been aged for 12 days at a temperature of 160° F. The results of these tests, wherein peel adhesion is given in terms of gms./inch width of tape, are presented in the following table. In this table the 90:10:1 vinylidene chloride:ethyl acrylate:fumaric acid terpolymer is referred to by the designation $ViCl_2$:EA:FA and the 95:5 vinyl chloride:vinyl acetate copolymer is referred to by the designation ViCl:ViAc.

| Sample Number | Saturant | Release Coating | Peel Adhesion | | | |
|---|---|---|---|---|---|---|
| | | | Tested Immediately— Drying Conditions For Coating | | Tested After 12 Days @ 160° F.— Drying Conditions For Coating | |
| | | | Air Dry | 10 Min. @ 266° F. | Air Dry | 10 Min. @ 266° F. |
| 1 | #1 | $ViCl_2$:EA:FA | 110 | 55 | 215 | 275 |
| 2 | #1 | ViCl:ViAc | 140 | 131 | 355 | 340 |
| 3 | #2 | $ViCl_2$:EA:FA | 95 | 35 | 135 | 150 |
| 4 | #2 | ViCl:ViAc | 120 | 133 | 350 | 300 |
| 5 | #3 | $ViCl_2$:EA:FA | 75 | 60 | 270 | 235 |
| 6 | #3 | ViCl:ViAc | 170 | 150 | 375 | 360 |
| 7 | #4 | $ViCl_2$:EA:FA | 200 | 231 | 250 | 250 |
| 8 | #4 | ViCl:ViAc | 166 | 188 | 620 | 450 |

With but two exceptions, the above results indicate the lower peel adhesion values which were obtained with our vinylidene chloride terpolymer resin release coatings and thus clearly indicates their superior release properties. Comparable results were also obtained using release coatings derived from vinylidene chloride terpolymer emulsions wherein the terpolymers had the following vinylidene chloride:ethyl acrylate:fumaric acid monomer ratios:

(1) 85:15:0.25
(2) 85:15:3.0
(3) 93:7:0.25
(4) 93:7:3.0

In addition, these terpolymer emulsions were also used to prepare release coatings on the non-adhesive surface of pressure sensitive labels having natural rubber based adhesive surfaces and paper backings.

*Example II*

This example again illustrates the superior release properties of our vinylidene chloride terpolymer coatings. It also demonstrates the superior performance of these release coatings with respect to the minimal effect which they have upon the pressure sensitive adhesive masses with which they are placed into contact.

A sheet of sulfite paper having a basis weight of 40 pounds per 3000 square feet was coated with 90:10:1 vinylidene chloride:ethyl acrylate:fumaric acid terpolymer emulsion having a resin solids content of 45%, by weight. The final dry coating weight was 10 pounds of resin solids per 3000 square feet of paper. The release properties of this coated sheet were then compared with another commonly employed release coating comprising a laminate of a clay coated sulfite paper with a 1 mil. cellulose triacetate film serving as the release coating surface. To each of these release coatings there was then adhered a one inch wide strip of a natural white rubber based pressure sensitive adhesive tape. The peel adhesion force required to separate the tape from each of these release coatings was then immediately determined using the Instron tensile tester at a peel rate of 12 inches per minute. The peel adhesion force was also determined on identical samples, i.e. release coating plus tape, which had been aged for 7 days at a temperature of 158° F. The results of these tests, wherein peel adhesion is given in terms of gms./inch width of tape are presented in the following table:

| Release Sheet | Peel Adhesion | |
|---|---|---|
| | Immediate | After 7 Days @ 158° F. |
| (1) 90:10:1 $ViCl_2$:EA:FA terpolymer film on sulfite paper | 38 | 770 |
| (2) Sulfite paper-cellulose triacetate laminate | 64 | 975 |

The lower peel adhesion values obtained with our vinylidene chloride terpolymer resin release coatings again demonstrates their superior release properties.

*Example III*

In order to point up the minimal effect which our release coatings have upon the adhesive properties of pressure sensitive adhesive masses, we prepared a release sheet which was identical to the vinylidene chloride terpolymer coated sheet whose preparation was described above. To this sheet there was again adhered a one inch wide strip of a natural white rubber based pressure sensitive adhesive tape. A similar strip of tape was then adhered to a release sheet comprising a laminate of sulfite paper and a 1 mil. cellulose triacetate film. These samples were then aged for 7 days at 140° F. whereupon the tapes were removed and immediately adhered to a stainless steel panel. The peel adhesion force required to remove these tapes from the steel panel was then determined using an Instron tensile tester at a peel rate of 12 inches per minute. The results of these tests, wherein peel adhesion is given in terms of gms./inch width of tape, are presented in the following table:

| Release Sheet | Peel Adhesion of Tape From Steel Plate |
|---|---|
| (1) 90:10:1 $ViCl_2$:EA:FA terpolymer film on sulfite paper | 680 |
| (2) Sulfite paper-cellulose triacetate laminate | 521 |

In this test the higher figure obtained for the peel adhesion of the tape which had been in contact with our vinylidene chloride terpolymer resin release coating indicated that the latter release coating had had less effect upon the adhesive properties of the pressure sensitive adhesive mass than had the cellulose triacetate laminate release coating.

Summarizing, our invention is thus seen to provide improved release coatings for use with rubber based pressure sensitive adhesives, said coatings being especially noteworthy for their low release values and their minimal effect upon the adhesives with which they are in contact. Variations may be made in proportions, procedures and materials without departing from the scope of this invention defined by the following claims.

We claim:

1. A pressure sensitive adhesive film comprising a paper backing coated on one surface with a rubber based pressure sensitive adhesive and coated on its other surface with a release coating comprising the dried aqueous latex of a vinylidene chloride:ethyl acrylate:fumaric acid terpolymer resin, said terpolymer containing, by weight, from 85% to 93% of vinylidene chloride, from 7% to 15% of ethyl acrylate and from 0.25% to 3.0% of fumaric acid, the weight of said release coating being from 4 to 14 pounds of resin solids per 3000 square feet of the substrate upon which it is coated.

2. In combination with a pressure-sensitive adhesive coating, a removable paper sheet having a release coating in contact with said pressure-sensitive adhesive coating, said release sheet comprising a paper backing coated on at least one surface with a dried aqueous latex of a vinylidene chloride:ethyl acrylate:fumaric acid terpolymer resin, said terpolymer containing, by weight, from 85% to 93% of vinylidene chloride, from 7% to 15% of ethyl acrylate and from 0.25% to 3.0% of fumaric acid, the weight of said release coating being from 4 to 14 pounds of resin solids per 3000 square feet of the substrate upon which it is coated.

References Cited in the file of this patent

UNITED STATES PATENTS

| | | |
|---|---|---|
| 2,570,478 | Pitzl | Oct. 9, 1951 |
| 2,607,711 | Hendricks | Aug. 19, 1952 |
| 2,636,870 | Connors et al. | Apr. 28, 1953 |
| 2,659,716 | Park | Nov. 17, 1953 |